(12) United States Patent
Suzuki et al.

(10) Patent No.: US 7,849,988 B2
(45) Date of Patent: Dec. 14, 2010

(54) POWER TRANSMITTING DEVICE

(75) Inventors: Kunihiko Suzuki, Gamagoori (JP);
Toshimi Hara, Takahama (JP); Naoyuki Kokubo, Aichi-ken (JP)

(73) Assignee: JTEKT Corporation, Osaka-shi (JP)

( * ) Notice: Subject to any disclaimer, the term of this patent is extended or adjusted under 35 U.S.C. 154(b) by 603 days.

(21) Appl. No.: 11/857,802

(22) Filed: Sep. 19, 2007

(65) Prior Publication Data

US 2008/0067024 A1  Mar. 20, 2008

(30) Foreign Application Priority Data

Sep. 20, 2006  (JP)  .............. 2006-254183

(51) Int. Cl.
*F16D 27/115* (2006.01)
(52) U.S. Cl. ...................... 192/35; 192/84.7
(58) Field of Classification Search ............ 192/84.7
See application file for complete search history.

(56) References Cited

U.S. PATENT DOCUMENTS 6,158,561 A  12/2000  Sakai et al.
6,578,684 B2  6/2003  Yamamoto et al.
6,905,007 B2 *  6/2005  Senga et al. ............... 192/35

FOREIGN PATENT DOCUMENTS

| EP | 0 856 676 A1 | 8/1998 |
|----|---|---|
| JP | 2002-48157 | 2/2002 |
| JP | 2002-61677 | 2/2002 |
| JP | 2002-340046 | 11/2002 |
| JP | 2003-14001 | 1/2003 |
| JP | 2003-106343 | 4/2003 |

* cited by examiner

*Primary Examiner*—Rodney H Bonck
(74) *Attorney, Agent, or Firm*—Oblon, Spivak, McClelland, Maier & Neustadt, L.L.P.

(57) ABSTRACT

In a power transmitting device, projections are formed on a surface of a main cam that faces an armature. This structure causes the main cam to contact the armature only at distal surfaces of the projections. The area of the distal surfaces of the projections is in a range where the magnetic flux density generated at the distal surfaces of the projections by the electromagnet is saturated. Therefore, reduction of the responsiveness and controllability of the power transmitting device due to magnetization of the main cam is suppressed.

2 Claims, 3 Drawing Sheets

POWER TRANSMITTING DEVICE

BACKGROUND OF THE INVENTION

The present invention relates to a power transmitting device.

Power transmitting devices of known configuration include a type that has a hollow cylindrical first rotor, which receives driving force and rotates, and a shaft-like second rotor, which is coaxial with and rotatably arranged in the first rotor. A clutch mechanism is located between the first rotor and the second rotor, and selectively permits and shuts off torque transmission between the first rotor and the second rotor. The clutch mechanism includes, for example, a main clutch, a pilot clutch, and a cam mechanism. The main clutch permits the torque transmission between the first rotor and the second rotor when being pressed along the axial direction of the first rotor. The pilot clutch is arranged adjacent to the main clutch along the axial direction of the first rotor. In accordance with the operation of the pilot clutch, the cam mechanism is selectively switched between a state where it presses the main clutch along the axial direction of the first rotor and a state where it does not press the main clutch.

For example, Japanese Laid-Open Patent Publication No. 2003-14001 discloses a power transmitting device having an electromagnetic clutch as a pilot clutch. The electromagnetic clutch has clutch plates that frictionally engage with each other when pressed by an armature that is moved when attracted by an electromagnet. When the pilot clutch is engaged, the torque due to the difference in rotation between the first rotor and the second rotor is converted into a linear motion of a cam member (the main cam) along the axial direction of the first rotor. Accordingly, the main clutch is pressed along the axial direction of the first rotor.

Although the cam member is located farther from the electromagnet than the armature with respect to the axial direction of the first rotor, the cam member can be magnetized if leakage of magnetic flux occurs. In such a case, the armature is attracted by the magnetized cam member. This hinders the movement of the armature toward the clutch plates, that is, the smooth operation of the electromagnetic clutch. The responsiveness and controllability of the power transmitting device are therefore degraded.

Particularly, the armature can be moved freely along the axial direction of the first rotor when the electromagnet is not energized. Therefore, when the electromagnet is not energized, the armature can be attracted by the magnetized cam member and separate from the pilot clutch. Even if the electromagnet is energized in this state, the armature may not be attracted by the electromagnet toward the pilot clutch.

In this respect, a typical first rotor accommodating a pilot clutch and a cam mechanism is made of a non-magnetic material such as an aluminum alloy to prevent magnetic flux leakage from occurring. Further, Japanese Laid-Open Patent Publication No. 2002-48157 discloses a configuration in which a spacer made of a non-magnetic material is inserted between an armature and a cam member, so that a space exists between the armature and the cam member. Also, Japanese Laid-Open Patent Publication No. 2002-61677 discloses a configuration in which a surface of an armature that does not face an electromagnet is coated with a non-magnetic material. However, these configurations unexpectedly complicate the manufacture of power transmitting devices and thus increase the manufacturing costs. There is thus still room for improvement.

SUMMARY OF THE INVENTION

Accordingly, it is an objective of the present invention to provide a power transmitting device that suppresses, with a simple structure, reduction of the responsiveness and controllability due to magnetization of a cam member.

To achieve the foregoing objective and in accordance with one aspect of the present invention, a power transmitting device having a hollow cylindrical first rotor that receives driving force and rotates, a shaft-like second rotor that is rotatably arranged in and coaxial with the first rotor, a first clutch, a second clutch, and a cam mechanism is provided. The first clutch selectively permits and shuts off torque transmission between the first rotor and the second rotor. When pressed along an axial direction of the first rotor, the first clutch permits torque transmission between the first rotor and the second rotor. The second clutch is arranged adjacent to the first clutch along the axial direction of the first rotor. The second clutch includes an electromagnet, a plurality clutch plates alternately arranged along the axial direction of the first rotor, and an armature movable along the axial direction of the first rotor. The clutch plates are located between the electromagnet and the armature. When the clutch plates are pressed by the armature that is attracted by and moved toward the electromagnet, each adjacent pair of the clutch plates are frictionally engaged with each other. The cam mechanism has a cam member arranged adjacent to the armature along the axial direction of the first rotor. The cam mechanism links the first clutch and the second clutch with each other. The cam mechanism converts a torque based on a rotational difference between the first rotor and the second rotor, which torque is transmitted through the second clutch, into a linear motion of the cam member along the axial direction of the first rotor. The first clutch is pressed by the cam member moving linearly along the axial direction of the first rotor. The area of a portion of the cam member that can contact the armature is set in a range where a magnetic flux density generated in the portion by the electromagnet is saturated.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 3.

Figure 1:
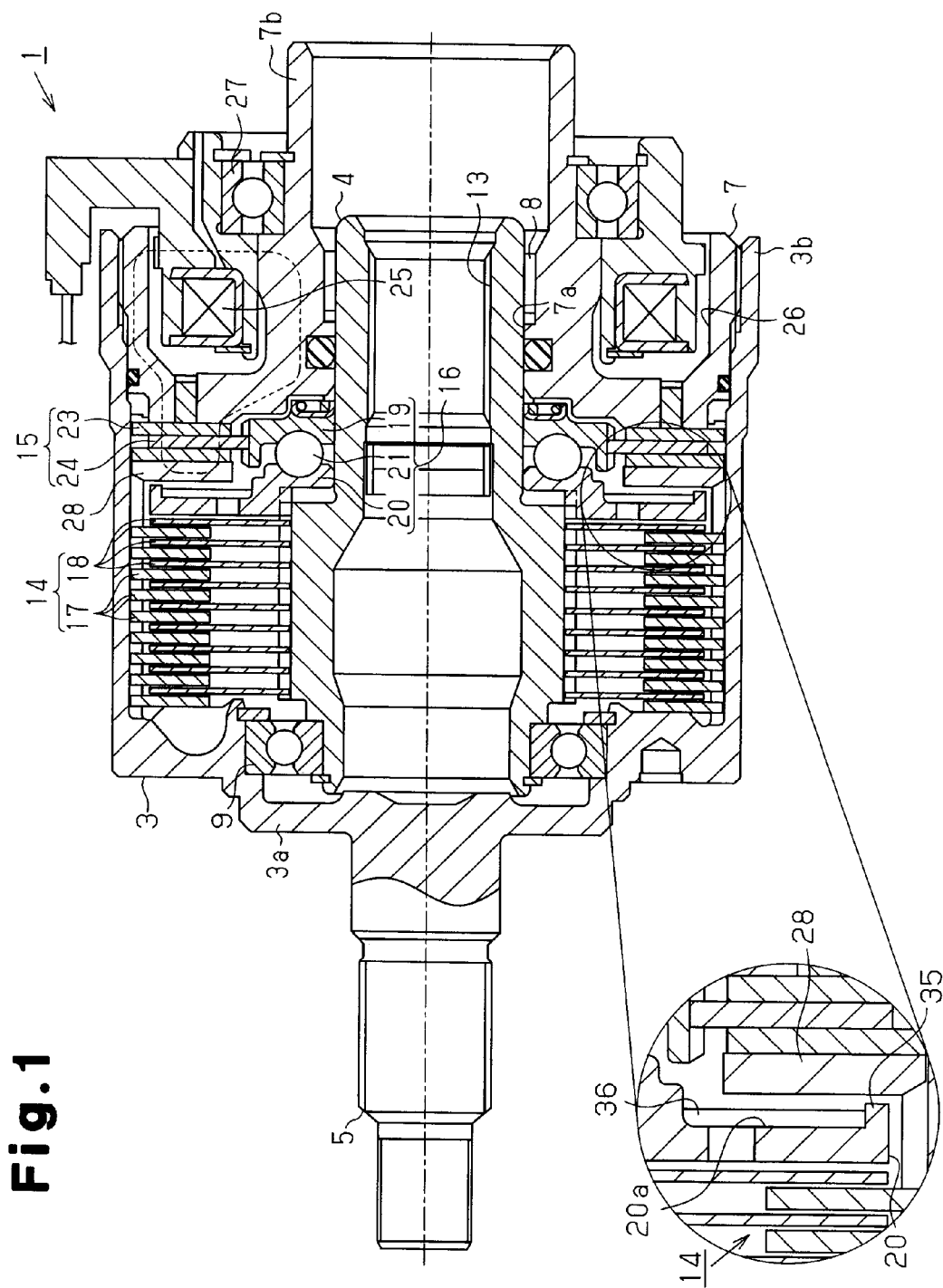
FIG. 1 is a cross-sectional view illustrating a power transmitting device according to one embodiment of the present invention.

As shown in FIG. 1, a power transmitting device 1 according to the present embodiment has a hollow cylindrical first rotor and a shaft-like second rotor rotatably arranged in and coaxial with the first rotor. In this embodiment, the first rotor is a front housing member 3 having a bottom portion 3a, and the second rotor is a hollow inner shaft 4.

A shaft-like coupling portion 5 that has a spline on the outer surface extends outward from the bottom portion 3a of the front housing member 3. The front housing member 3 is coupled to a propeller shaft (not shown) at the coupling portion 5, and rotates on the basis of driving force generated by the engine (not shown), which is a driving source, transmitted through the coupling portion 5.

An annular rear housing member 7 is fitted in the vicinity of an open end 3b of the front housing member 3. The rear housing member 7 has a central hole 7a through which the inner shaft 4 extends. The inner shaft 4 is rotatably supported by a slide bearing 8 arranged in the central hole 7a of the rear housing member 7 and a ball bearing 9 arranged in the front housing member 3. A spline engagement portion 13 is formed on the inner surface of an end of the inner shaft 4 closer to the rear housing member 7 (right end as viewed in FIG. 1). The spline engagement portion 13 functions as a coupling portion coupled to a rear differential (not shown).

A first clutch, which is a main clutch 14, a second clutch, which is a pilot clutch 15, and a cam mechanism 16 linking the main clutch 14 and the pilot clutch 15 to each other are arranged in the front housing member 3. The main clutch 14 selectively permits and shuts off the transmission of torque between the front housing member 3 and the inner shaft 4. The pilot clutch 15 is arranged adjacent to the main clutch 14 along the axial direction of the front housing member 3 such that the pilot clutch 15 is located closer to the rear housing member 7 than the main clutch 14 with respect to the axial direction of the front housing member 3.

The main clutch 14 is a multi-plate friction clutch having a plurality of outer clutch plates 17 and inner clutch plates 18 alternately arranged along the axial direction of the front housing member 3. The outer clutch plates 17 are engaged with the inner circumferential surface of the front housing member 3 by means of spline. Each outer clutch plate 17 is movable along the axial direction of the front housing member 3 and is rotatable integrally with the front housing member 3. The inner clutch plates 18 are engaged with the outer circumferential surface of the inner shaft 4 by means of spline. Each inner clutch plate 18 is movable along the axial direction of the front housing member 3 and is rotatable integrally with the inner shaft 4.

When the main clutch 14 is pressed along the axial direction of the front housing member 3, each adjacent pair of the outer clutch plates 17 and the inner clutch plates 18 are frictionally engaged with each other, which permits the torque transmission between the front housing member 3 and the inner shaft 4.

The cam mechanism 16 includes a pilot cam 19, a main cam 20, and ball members 21 located between the pilot cam 19 and the main cam 20. The pilot cam 19 is rotatably supported by the inner shaft 4. The main cam 20 is engaged with the outer circumferential surface of the inner shaft 4 by means of spline. The main cam 20 is movable along the axial direction of the front housing member 3 and is rotatable integrally with the inner shaft 4. The pilot cam 19, the main cam 20, and the ball members 21 are made of iron-based magnetic metal to satisfy the required strength.

The pilot cam 19 and the main cam 20 are both shaped like a disc. The pilot cam 19 is located close to the rear housing member 7, and the main cam 20 is located close to the main clutch 14. The pilot cam 19 is engaged with an inner circumference of an inner clutch plate 24, which will be discussed below, of the pilot clutch 15 by means of spline. The main cam 20 is engaged with the outer circumferential surface of the inner shaft 4 by means of spline. V-shaped grooves are formed on surfaces of the pilot cam 19 and the main cam 20 that face each other. The ball members 21 are held between the pilot cam 19 and the main cam 20 in such a manner that each ball member 21 is located in a facing pair of the V-shaped grooves of the pilot cam 19 and the main cam 20. In the cam mechanism 16, relative rotation of the pilot cam 19 and the main cam 20 causes the pilot cam 19 and the main cam 20 move away from each other. More specifically, the main cam 20, functioning as a cam member, moves toward the main clutch 14 along the axial direction of the front housing member 3.

Like the main clutch 14, the above described pilot clutch 15 is a multi-plate friction clutch having a plurality of outer clutch plates 23 and inner clutch plates 24 alternately arranged along the axial direction of the front housing member 3. The outer clutch plates 23 are engaged with the inner circumferential surface of the front housing member 3 by means of spline. Each outer clutch plate 23 is movable along the axial direction of the front housing member 3 and is rotatable integrally with the front housing member 3. The inner clutch plates 24 are engaged with the outer circumferential surface of the pilot cam 19 by means of spline. Each inner clutch plate 24 is movable along the axial direction of the front housing member 3 and is rotatable integrally with the pilot cam 19. When the pilot clutch 15 is pressed along the axial direction of the front housing member 3, each adjacent pair of the outer clutch plates 23 and the inner clutch plates 24 are frictionally engaged with each other, which permits the torque transmission between the front housing member 3 and the pilot cam 19.

Therefore, when the pilot clutch 15 is disengaged, that is when the torque transmission between the front housing member 3 and the pilot cam 19 is shut off, the pilot cam 19 rotates integrally with the main cam 20, that is, with the inner shaft 4. Thus, a rotational difference is generated between the front housing member 3 and the pilot cam 19, which corresponds to the rotational difference between the front housing member 3 and the inner shaft 4. On the other hand, when the pilot clutch 15 is engaged, that is, when the torque transmission between the front housing member 3 and the pilot cam 19 is permitted, torque based on the rotational difference between the front housing member 3 and the inner shaft 4 (the pilot cam 19) is transmitted to the cam mechanism 16.

When transmitted to the cam mechanism 16, the torque based on the rotational difference between the front housing member 3 and the inner shaft 4 generates a rotational difference between the pilot cam 19 and the main cam 20 in the cam mechanism 16. Based on this rotational difference, the main cam 20 moves toward the main clutch 14 along the axial direction of the front housing member 3. That is, the cam mechanism 16 converts the torque based on the rotational difference between the front housing member 3 and the inner shaft 4 transmitted through the pilot clutch 15 into a linear motion of the main cam 20 along the axial direction of the front housing member 3. The main clutch 14 is pressed by the main cam 20, which moves linearly, and is thus engaged, which permits torque transmission between the front housing member 3 and the inner shaft 4.

The pilot clutch 15 is driven by an electromagnet 25. An annular groove 26 is formed in the rear housing member 7. The annular groove 26 has an opening that faces the outside of the front housing member 3 (rightward as viewed in FIG. 1). The electromagnet 25 is accommodated in the annular groove 26. A cylindrical portion 7b extends from a center of the rear housing member 7 toward the outside of the front housing member 3. The electromagnet 25 is rotatably supported by the rear housing member 7 (and the front housing member) by means of a ball bearing 27 located in the cylindrical portion 7b.

An annular armature 28 is arranged in the front housing member 3. More specifically, the armature 28 is arranged adjacent to the main cam 20 of the cam mechanism 16 (on the right side of the main cam 20 as viewed in FIG. 1) such that the pilot clutch 15 is located between the armature 28 and the rear housing member 7. The armature 28 is engaged with the inner circumferential surface of the front housing member 3 by means of spline. The armature 28 is movable along the axial direction of the front housing member 3, but is not rotatable relative to the front housing member 3. Frictional engagement between each adjacent pair of the outer clutch plates 23 and the inner clutch plates 24 of the pilot clutch 15 is caused when the armature 28 is attracted by the electromagnet 25 and presses the pilot clutch 15.

In this manner, the operation of the pilot clutch 15 of the power transmitting device 1 is controlled through supply of electricity to the electromagnet 25. In accordance with the operation of the pilot clutch 15, the operation of the main clutch 14, that is, the torque transmission between the front housing member 3 and the inner shaft 4 is selectively permitted and shut off.

A structure for preventing the armature 28 from being attracted by the main cam 20 will now be described.

Figure 2A:
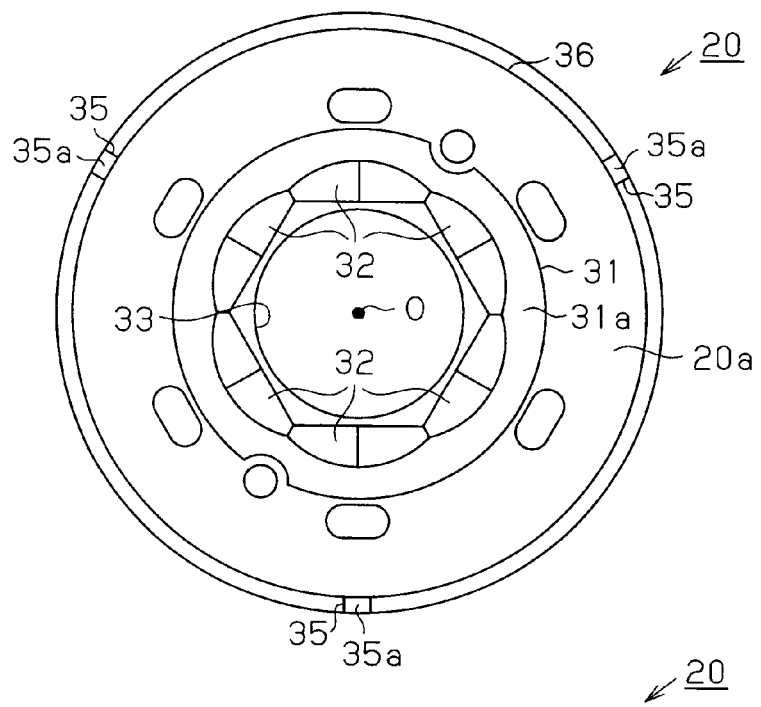
FIG. 2A is a plan view illustrating a main clutch of the power transmitting device of FIG. 1.
Figure 2B:
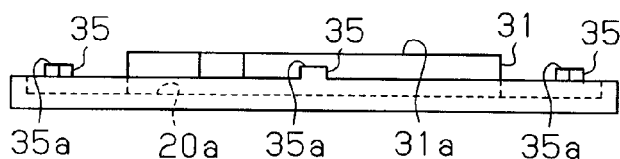
FIG. 2B is a side view showing the main clutch of FIG. 2A.
Figure 3:
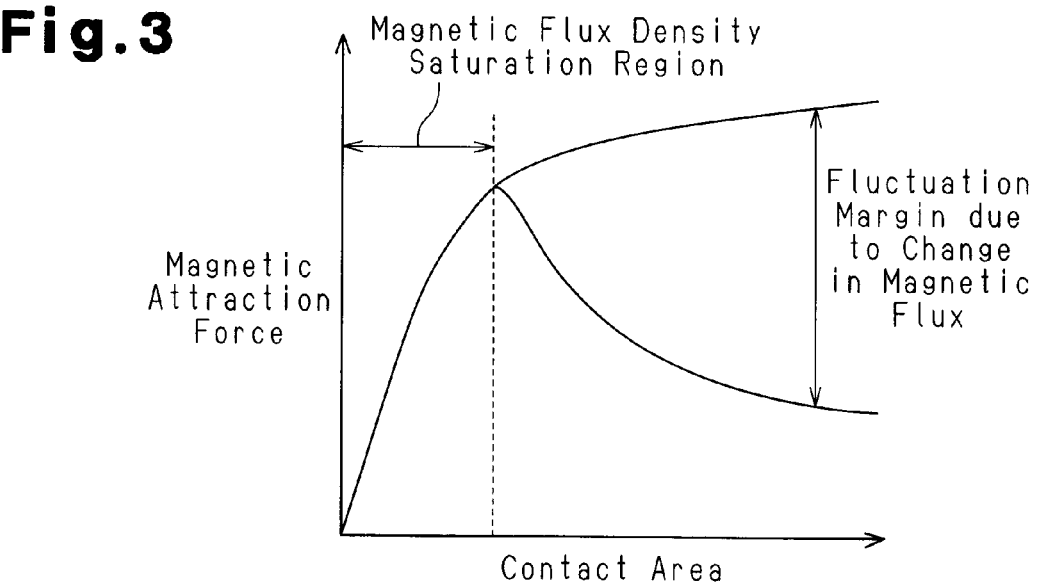
FIG. 3 is a graph showing the relationship between the magnetic attraction of the main cam and the area of portions of the main cam that contact an armature.

As shown in FIGS. 2A and 2B, a substantially columnar coupling portion 31 is provided in a center of the disc-shaped main cam 20. Triangular grooves 32 (the aforementioned V-shaped grooves) for holding the ball members 21 between the pilot cam 19 and the main cam 20 are formed on an end face 31a of the coupling portion 31. An insertion hole 33 that extends through the coupling portion 31 is formed in a center of the coupling portion 31. The inner shaft 4 extends through the insertion hole 33.

The main cam 20 is engaged with the inner shaft 4 by means of spline such that the end face 31a, on which the triangular grooves 32 are formed, faces the rear housing member 7. In this state, the main cam 20 is movable along the axial direction of the front housing member 3. As shown in FIG. 1, the main cam 20 is arranged adjacent to the main clutch 14 (on the right side of the main clutch 14 as viewed in FIG. 1) such that the main cam 20 is located closer to the rear housing member 7 than the main clutch 14 with respect to the axial direction of the front housing member 3.

Projections 35 are provided on a surface 20a of the main cam 20 that does not face the main clutch 14, that is, on the surface 20a of the main cam 20 that faces the armature 28. More specifically, the projections 35 are formed on an annular rib 36 formed at the outer periphery of the main cam 20, while being spaced from each other. In this embodiment, the number of the projections 35 is three. The projections 35 are substantially symmetrical with respect to an axis O of the main cam 20, or arranged at substantially equal angular intervals. When the armature 28 moves toward the main cam 20 along the axial direction of the front housing member 3 and contacts the main cam 20, the main cam 20 contacts the armature 28 only at distal surfaces 35a of the projections 35.

The total area of the distal surfaces 35a of the projections 35, that is, the total area of portions of the main cam 20 that are contactable to the armature 28, is determined to be in a range in which the density of the magnetic flux generated in the portions (the distal surfaces 35a of the projections 35) by the electromagnet 25 is saturated. Therefore, even if the main cam 20 is magnetized due to magnetic flux leakage, the force by which the main cam 20 attracts the armature 28 is reduced. This ensures the smooth operation of the pilot clutch 15, which is an electromagnetic clutch, and suppresses reduction of the responsiveness and controllability of the power transmitting device 1.

More specifically, when the magnetic flux, the magnetic permeability, the passage section of the magnetic flux, and the magnetic flux density are represented by $\phi$, $\mu$, S, and B, respectively, the attraction force F caused by passing of the magnetic flux is represented by the following two expressions (1) and (2).

$$F = B^2 \cdot S / (2 \cdot \mu) \quad (1)$$

$$F = \phi^2 / (2 \cdot \mu \cdot S) \quad (2)$$

As obvious from the expression (1), with the magnetic flux density B being constant, the attraction force F is reduced as the magnetic flux passage section S is reduced. Therefore, when the magnetic flux density B is constant, the force by which the main cam 20 attracts the armature 28 can be reduced by reducing the magnetic flux passage section S, that is, by reducing the area of the portions of the main cam 20 that contact the armature 28. On the other hand, with the magnetic flux $\phi$ being constant, the magnetic flux density B is increased as the magnetic flux passage section S is reduced. Also, with the magnetic flux $\phi$ being constant, the attraction force F is increased as the magnetic flux passage section S is reduced as obvious from the expression (2). Therefore, in the power transmitting device 1, since the magnetic flux that passes through the portions of the main cam 20 that contact the armature 28 is changed by the amount of current supplied to the electromagnet 25, the force by which the main cam 20 attracts the armature 28 cannot be always reduced by reducing the area of such portions of the main cam 20.

However, if the magnetic flux density B has already been saturated, the attraction force F changed depending only on the relationship represented by the expression (1) since the magnetic flux density B is constant regardless of reduction of the magnetic flux passage section S. Therefore, by setting the area of the portions of the main cam 20 that can contact the armature 28 to be in a range where the magnetic flux generated in such portions of the main cam 20 by the electromagnet 25 is saturated, that is, by setting the area to be in the magnetic flux density saturation region shown in FIG. 3, the force by which the main cam 20 attracts the armature 28 is reliably reduced.

This embodiment provides the following advantages.

The projections 35 are provided on a surface 20a of the main cam 20 that does not face the main clutch 14, that is, on the surface 20a of the main cam 20 that faces the armature 28. When the armature 28 moves toward the main cam 20 and contacts the main cam 20, the main cam 20 contacts the armature 28 only at the distal surfaces 35a of the projections 35. In the present embodiment, the area of the portions of the main cam 20 that can contact the armature 28 is set in a range where the magnetic flux density generated in the portions by the electromagnet 25 is saturated. As a result, the force by which the main cam 20 attracts the armature 28 is reliably reduced. That is, since the upper limit of the attraction force F is defined regardless of the magnitude of residual magnetism of the main cam 20, the size of the power transmitting device 1 is reduced while ensuring the operation of the pilot clutch 15 by setting the measurements of the components such that, even if the attraction force F has the upper limit value, the armature 28 is reliably attracted by the electromagnet 25 toward the pilot clutch 15 when the electromagnet 25 is energized. Also, in the present embodiment, since the portions of the main cam 20 that can contact the armature 28 are limited to the distal surfaces 35a of the projections 35, the area of such portions of the main cam 20 is easily set to an appropriate value. Therefore, reduction of the responsiveness and controllability of the power transmitting device 1 due to magnetization of the main cam 20 is suppressed with a simple structure.

The projections 35 are substantially symmetrical with respect to the axis O of the main cam 20, or arranged at substantially equal angular intervals. Thus, even if the axis of the main cam 20 or the armature 28 wobbles, fluctuations of the area of the portions of the main cam 20 that can contact the armature 28 are suppressed. As a result, the stability is improved such that the armature 28 is prevented from being attracted by the main cam 20.

Since the number of the projections 35 is three, the main cam 20 reliably contacts the armature 28 at the distal surfaces 35a of the projections 35 even if the axis of the main cam 20 or the armature 28 wobbles. Therefore, the area of the portions of the main cam 20 that can contact the armature 28 is further effectively prevented from fluctuating.

The preferred embodiment may be modified as follows.

In the illustrated embodiment, the main cam 20 can contact the armature 28 at the distal surfaces 35a of the projections 35. However, the main cam 20 may contact the armature 28 at portions other than the distal surfaces 35a as long as the area of the portions of the main cam 20 that contact the armature 28 is in the range where the magnetic flux density generated in such portions by the electromagnet 25 is saturated, that is, as long as the area is in the magnetic flux density saturation region shown in FIG. 3. For example, the projections 35 may be omitted, and the main cam 20 may contact the armature 28 at the distal surface of the rib 36. In this case, the area of the distal surface of the rib 36 needs to be in a range where the magnetic flux density generated at the distal surface of the rib 36 by the electromagnet 25 is saturated.

In the illustrated embodiment, the number of the projections 35 is plural, more specifically, three. However, the number is not necessarily limited.

In the illustrated embodiment, the projections 35 are located on the distal surface of the rib 36. However, the positions of the projections 35 are not limited to the distal surface of the rib 36.

In the illustrated embodiment, the projections 35 are substantially symmetrical with respect to a point. However, the projections 35 do not necessarily need to be symmetrical with respect to a point.

Figure 4:
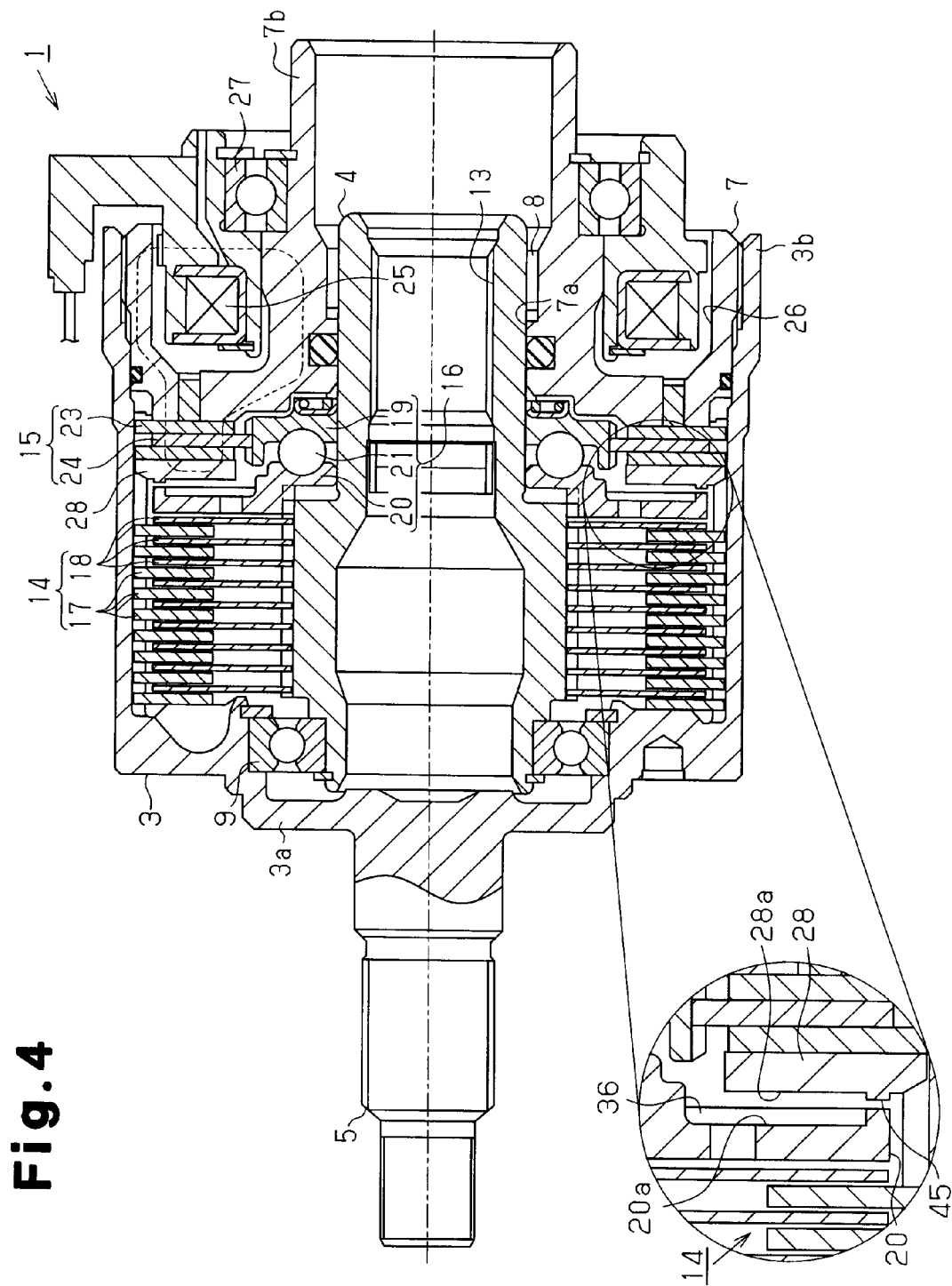
FIG. 4 is a cross-sectional view illustrating a power transmitting device according to another embodiment of the present invention.

In the illustrated embodiment, the projections 35 are provided on the surface 20a of the main cam 20 that faces the armature 28. However, as long as the area of the portions of the main cam 20 that contact the armature 28 is in the magnetic flux density saturation region shown in FIG. 3, the projections 35 may be replaced by projections 45 that are located on a surface 28a of the armature 28 that faces the main cam 20 as shown in FIG. 4. The number of the projections 45 may be one or plural, but is preferably three. If the number of the projections 45 is plural, the projections 45 are preferably substantially symmetrical with respect to an axis of the armature 28, in other words, arranged at substantially equal angular intervals.

The invention claimed is:

1. A power transmitting device comprising:
   a hollow cylindrical first rotor that receives driving force and rotates;
   a shaft-like second rotor that is rotatably arranged in and coaxial with the first rotor;
   a first clutch that selectively permits and shuts off torque transmission between the first rotor and the second rotor, wherein, when pressed along an axial direction of the first rotor, the first clutch permits torque transmission between the first rotor and the second rotor;
   a second clutch arranged adjacent to the first clutch along the axial direction of the first rotor, wherein the second clutch includes an electromagnet, a plurality clutch plates alternately arranged along the axial direction of the first rotor, and an armature movable along the axial direction of the first rotor, the clutch plates being located between the electromagnet and the armature, wherein, when the clutch plates are pressed by the armature that is attracted by and moved toward the electromagnet, each adjacent pair of the clutch plates are frictionally engaged with each other;
   a cam mechanism having a cam member arranged adjacent to the armature along the axial direction of the first rotor, the cam mechanism linking the first clutch and the second clutch with each other, wherein the cam mechanism converts a torque based on a rotational difference between the first rotor and the second rotor, which torque is transmitted through the second clutch, into a linear motion of the cam member along the axial direction of the first rotor, and wherein the first clutch is pressed by the cam member moving linearly along the axial direction of the first rotor;
   a plurality of projections provided either on a surface of the cam member that faces the armature or on a surface of the armature that faces the cam member, the plurality of projections being arranged symmetrical with respect to an axis of the respective one of the cam member and the armature on which the projections are provided, wherein the cam member and the armature can contact each other at the projections,
   wherein the area of a portion of the cam member that can contact the armature corresponds to the area of said projections and is set in a range where a magnetic flux density generated in the portion by the electromagnet is saturated.

2. The power transmitting device according to claim 1, wherein the number of the projections is three.

* * * * *